(12) United States Patent
Matsui

(10) Patent No.: US 7,404,328 B2
(45) Date of Patent: Jul. 29, 2008

(54) PRESSURE SENSOR

(75) Inventor: Hiroshige Matsui, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/591,553

(22) Filed: Nov. 2, 2006

(65) Prior Publication Data

US 2007/0113660 A1 May 24, 2007

(30) Foreign Application Priority Data

Nov. 8, 2005 (JP) ............................. 2005-323445

(51) Int. Cl.
*G01L 7/08* (2006.01)
(52) U.S. Cl. ............................................... 73/715
(58) Field of Classification Search .................. 73/715, 73/729.2, 756, 718, 717, 706
See application file for complete search history.

(56) References Cited

U.S. PATENT DOCUMENTS 5,488,868 A    2/1996    Ootake et al.
5,583,295 A    12/1996   Nagase et al.
6,120,033 A *  9/2000    Filippi et al. ................. 277/315
6,318,497 B1 * 11/2001   De Groot et al. ............. 181/110
6,845,674 B2 *  1/2005   Becker et al. .................. 73/717
6,955,089 B2 * 10/2005   Otsuka et al. .................. 73/715
6,971,268 B2   12/2005   Baba et al.
7,162,926 B1 *  1/2007   Guziak et al. .............. 73/729.2

FOREIGN PATENT DOCUMENTS

JP    A-10-046239    2/1998

* cited by examiner

*Primary Examiner*—Jewel V Thompson
(74) *Attorney, Agent, or Firm*—Posz Law Group, PLC

(57) ABSTRACT

A pressure sensor includes a sensor element having a sensing portion for generating a signal upon receiving a pressure, a pressure transmission member having one end attached to a sensing portion of the sensor element and a diaphragm having two sides that warp under application of the pressure. One side of the diaphragm serves as a pressure sensing surface for detecting the pressure applied thereon and another side serves as an attachment surface to be attached to another end of the pressure transmission member for transmitting the pressure to the sensing portion of the sensor element, and the diaphragm takes a shape of corrugation that has a plural number of bends formed therein.

18 Claims, 3 Drawing Sheets

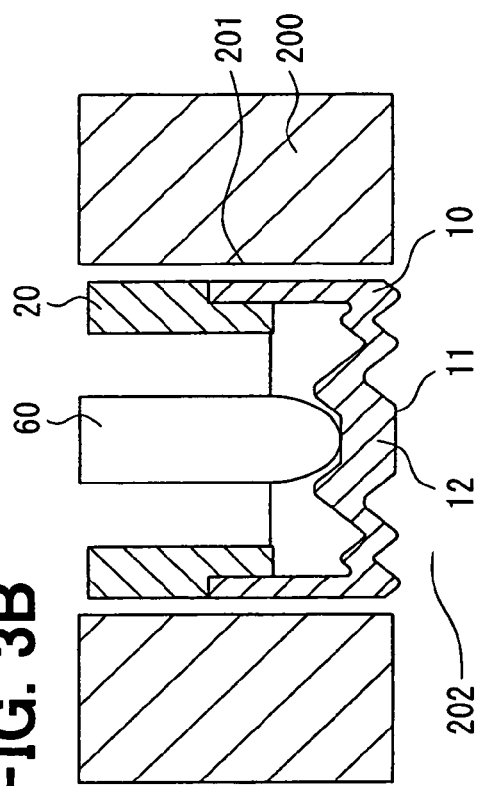
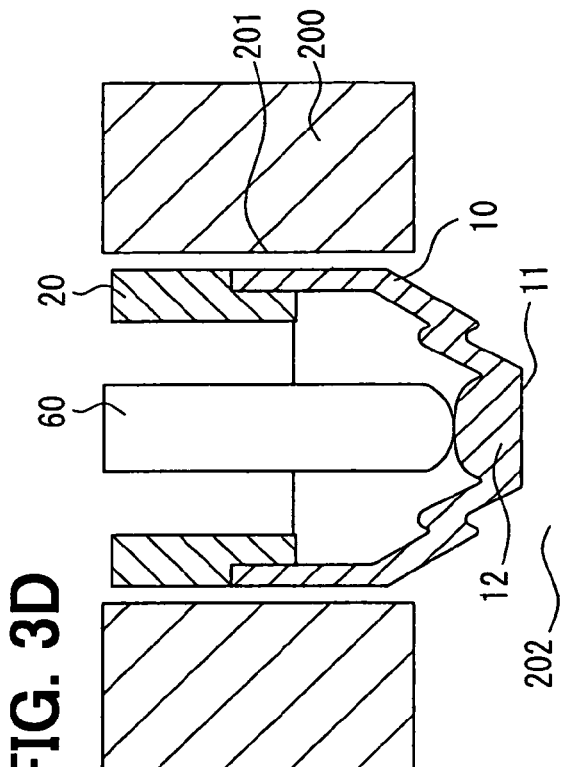
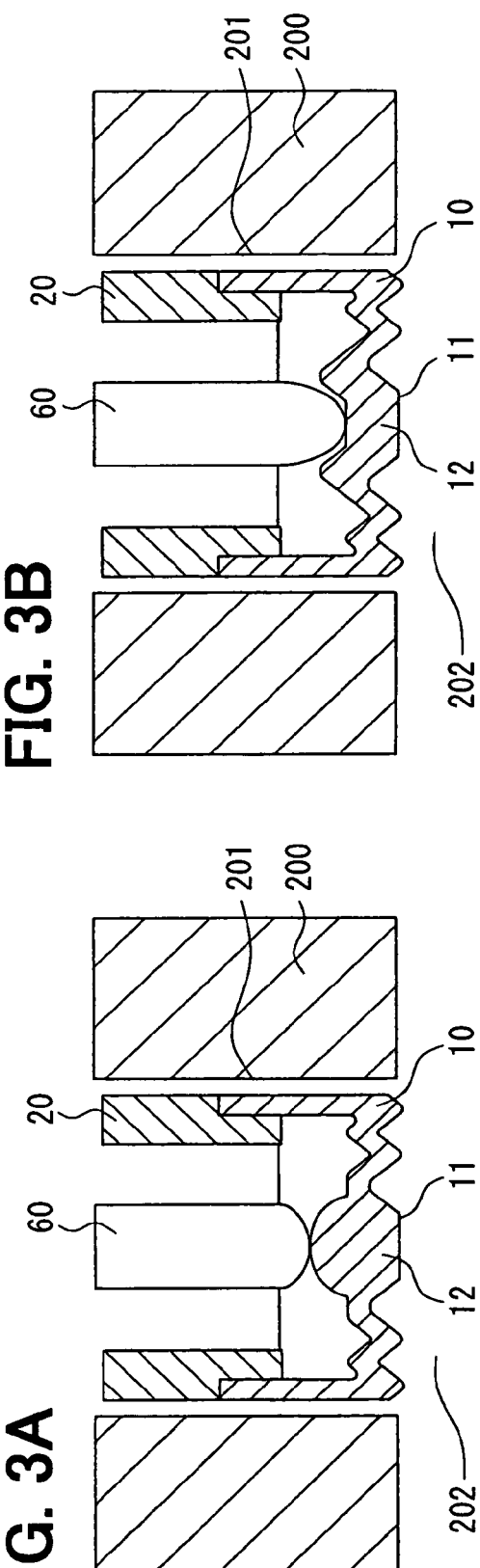
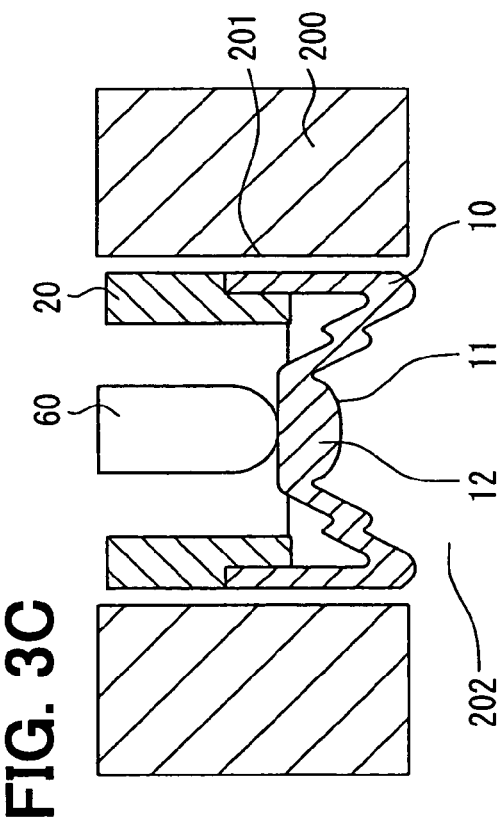

PRESSURE SENSOR

CROSS REFERENCE TO RELATED APPLICATION

This application is based on and claims the benefit of priority of Japanese Patent Application No. 2005-323445 filed on Nov. 8, 2005, the disclosure of which is incorporated herein by reference.

FIELD OF THE INVENTION

The present invention generally relates to a pressure sensor that detects a pressure of an object by transmitting the pressure from a diaphragm to a sensing portion of a sensor element.

BACKGROUND OF THE INVENTION

Conventionally, various types of pressure sensors are proposed for detecting a pressure that is transmitted from a diaphragm to a sensing portion of a sensor element by a pressure transmission member that is interposed between the diaphragm and the sensing portion of the sensor element. For example, U.S. Pat. No. 5,488,868 discloses a pressure sensor for generating a detection signal upon detecting a pressure of an object with the above-described structure that includes the diaphragm that warps under pressure of the object, the sensor element, and the pressure transmission member that touches one surface of the diaphragm by one end and also touches the sensing portion of the sensor element by another end.

However, the diaphragm in the pressure sensor is always pressed by the pressure transmission member for securely having contact with the transmission member. Therefore, the diaphragm is prone to damage such as breakage caused by the pressure from the pressure transmission member. In this case, the thickness of the diaphragm may be increased for improved mechanical strength of the diaphragm, with the sensitivity of the pressure sensor being compromised in return for the improved strength.

SUMMARY OF THE INVENTION

In view of the above-described and other problems, the present invention provides a pressure sensor that detects a pressure being transmitted to a sensor element from a diaphragm that has an improved mechanical strength without compromising the resilience against the pressure.

In one aspect of the present disclosure, the pressure sensor includes a sensor element having a sensing portion for generating a signal upon receiving a pressure, a pressure transmission member having one end attached to a sensing portion of the sensor element, and a diaphragm having two sides that warp under application of the pressure. One side of the diaphragm serves as a pressure sensing surface for detecting the pressure applied thereon and another side serves as an attachment surface to be attached to another end of the pressure transmission member for transmitting the pressure to the sensing portion of the sensor element, and the diaphragm takes a shape of corrugation that has a plural number of bends formed therein. In this manner, an improved mechanical strength is provided for the diaphragm without compromising the resilience against the pressure applied thereon.

In another aspect of the present disclosure, the pressure transmission member in contact with a generally flat portion of the diaphragm applies a reaction force to the diaphragm for detecting the pressure applied thereon. That is, resilience of a peripheral area of the diaphragm in the shape of corrugation provides the reaction force for a flat contact portion at a center of the diaphragm in contact with the transmission member, thereby enabling the diaphragm to serve as a pressure sensing portion of the pressure sensor. In this manner, the resilience of the diaphragm is improved without compromising the strength.

In yet another aspect of the invention, the contact portion of diaphragm is thicker than the peripheral area of the diaphragm. In this manner, the mechanical strength of the contact portion of the diaphragm is improved.

BRIEF DESCRIPTION OF THE DRAWINGS

Other objects, features and advantages of the present invention will become more apparent from the following detailed description made with reference to the accompanying drawings, in which:

FIGS. 3A to 3D show illustrations of the expanded cross-sectional view of the pressure sensor in other embodiments of the present invention.

DETAILED DESCRIPTION OF THE PREFERRED EMBODIMENTS

Embodiments of the present invention are described with reference to the drawings. Like parts have like numbers in each of the embodiments.

Figure 1:
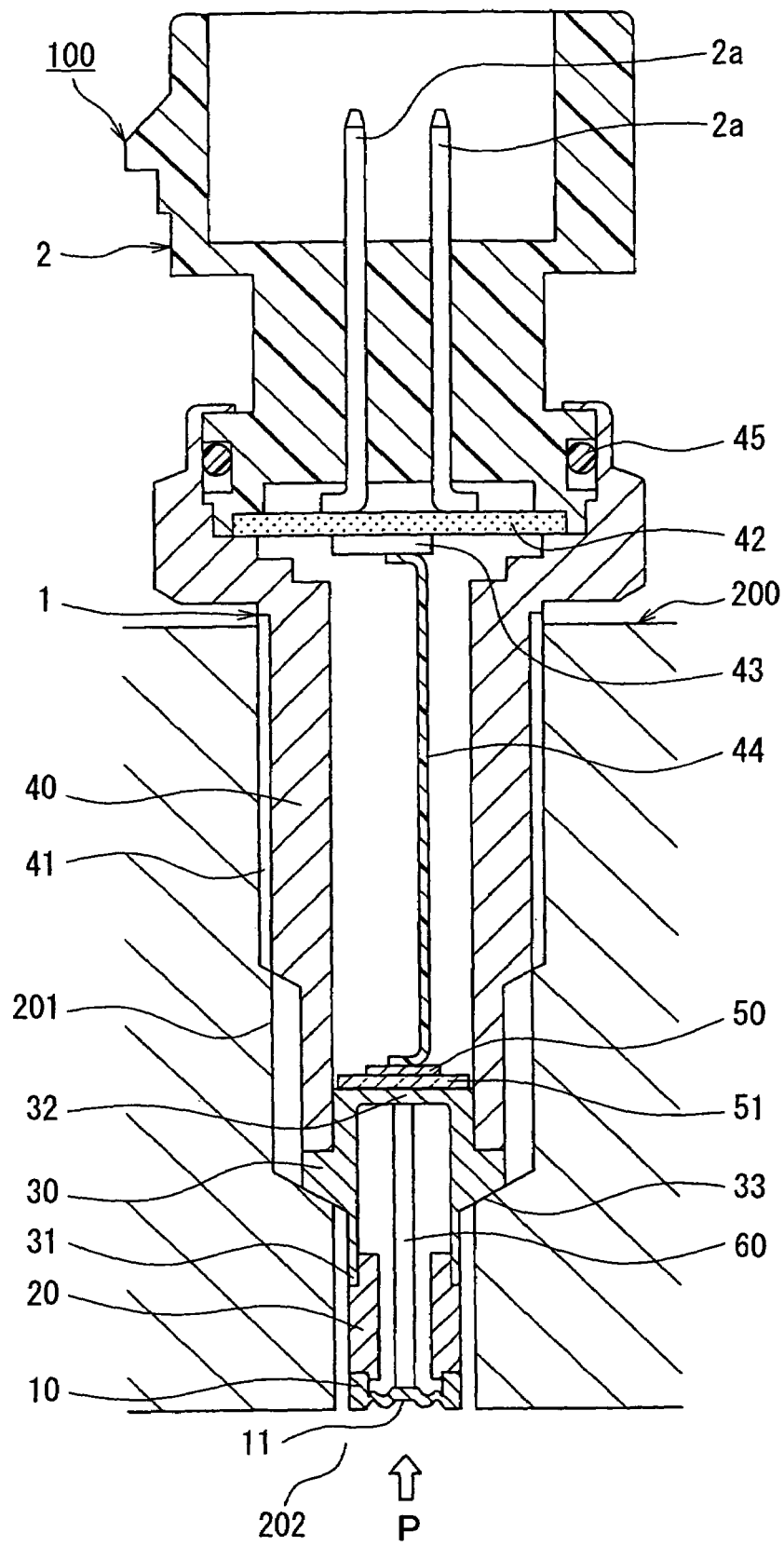
FIG. 1 shows a cross-sectional view of a pressure sensor in an embodiment of the present invention.
Figure 2:
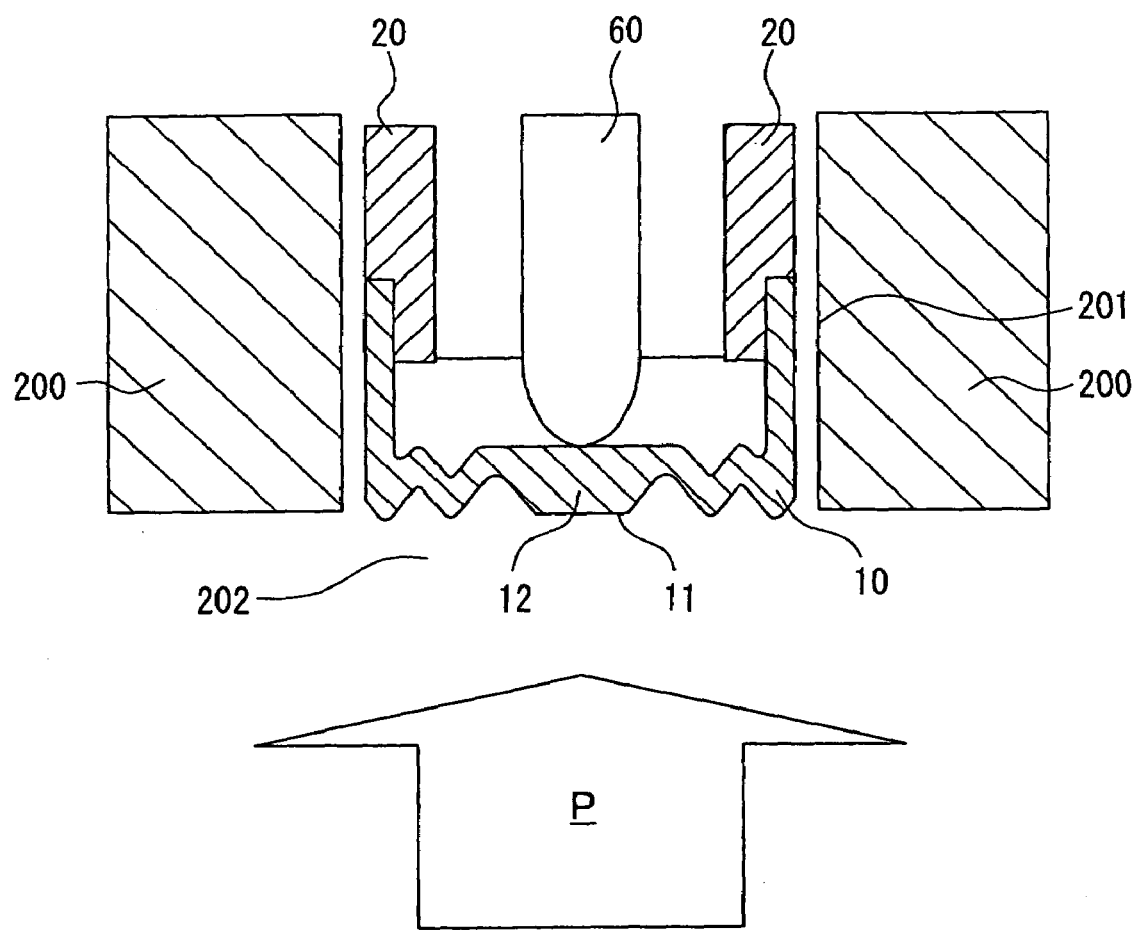
FIG. 2 shows an expanded cross-sectional view of the pressure sensor in FIG. 1 including a diaphragm.

A pressure sensor in an embodiment of the present invention is described in the following. FIG. 1 shows a cross-sectional view of a pressure sensor 100 disposed on an engine 200, and FIG. 2 shows an expanded cross-sectional view of a diaphragm 10 in the pressure sensor 100. The pressure sensor 100 is used to detect a pressure of a combustion chamber 202 of the engine 200.

The pressure sensor 100 includes a body portion 1 and a connector portion 2 in connection with the body portion 1. The body portion 1 of the pressure sensor 100 has an end portion (a lower end in FIG. 1) that is inserted in a mounting hole 201 for having exposure to the combustion chamber 202 of the engine 200.

In the present embodiment, the body portion 1 is formed by combining the diaphragm 10 for receiving a pressure, a metal case 20 in a cylindrical shape, a metal stem 30 in a cylindrical shape, and a housing 40 in a cylindrical shape with brazing, welding or similar method in order from one end toward another end. Then, the housing 40 in the body portion 1 is connected to the connector portion 2 to form the another end of the pressure sensor.

The housing 40 is made of, for example, metal such as stainless steel or the like, and an outer surface of the housing 40 has a mounting portion 41 (e.g., a screw portion 41 in the present embodiment) for fixing the pressure sensor 100 on the mounting hole 201 of the engine 200.

The mounting portion 41 is formed as a screw portion 41 in the present embodiment for engagement with the mounting hole 201 of the engine 200.

The metal stem 30 takes a hollow cylindrical shape, and is made of metal such as stainless steel or the like. The metal stem 30 includes an opening 31 on the metal case 20 side and a closed thin portion on the housing 40 side as a strain portion 32.

The strain portion 32 in the metal stem 30 warps upon receiving a pressure P originally applied to the diaphragm 10 through a pressure transmission member. The strain portion 32 has a sensing portion 50 disposed thereon for generating a pressure signal.

The sensing portion 50 is, for example, includes a bridge circuit of strain gauges formed as diffused resistors in a semiconductor chip. The strain of the sensing portion 50 is outputted as the pressure signal from the bridge circuit. The sensing portion 50 in the present embodiment is attached to the metal stem 30 with a low-melting glass 51.

The metal stem 30 has a seal surface 33 on an entire outer surface in a tapered shape that protrudes perpendicularly from the outer surface. The seal surface 33 seals the engagement of pressure sensor 100 with an inner surface of the mounting hole 201 when the pressure sensor 100 is disposed on the engine 200.

The metal case 20 is made of, for example, metal such as stainless steel or the like, and is engaged with and fixed in the opening 31 of the metal stem 30. The diaphragm 10 is fixed on an end of the metal case 20, that is, on a combustion chamber 202 side of the body portion 1.

The diaphragm 10 takes a shape of a disk being made of metal such as stainless steel or the like. One surface 11 of the diaphragm, that is, the surface 11 exposed to the combustion chamber 202 serves as a pressure sensing surface 11 that receives the pressure P in the combustion chamber 202.

The pressure P in the combustion chamber 202 is applied to the pressure sensing surface 11 on one end of the body portion 1 as indicated by a white arrow P in FIG. 1, thereby warping the diaphragm 10.

A hollow space defined by the metal stem 30 and the metal case 20 houses a pressure transmission member 60. The pressure transmission member 60 is made of, for example, metal (e.g., stainless steel or the like) or ceramics, and takes a rod shape in the present embodiment.

Each end of the pressure transmission member 60 is respectively in contact with the strain portion 32 of the metal stem 30 and an opposite side of the pressure sensing surface 11 of the diaphragm 10 in an abutting manner. That is, the pressure transmission member 60 and the strain portion 32/pressure sensing surface 11 apply the reaction force to each other for securely transmitting the pressure P from the diaphragm 10 to the strain portion 32 of the metal stem 30 through the pressure transmission member 60.

Thus, the pressure sensor 100 in the present embodiment includes the diaphragm 10 for detecting the pressure P by using the pressure sensing surface 11, the pressure transmission member 60 having one end in contact with a reverse side of the diaphragm 10, and the sensing portion 50 in contact with another end of the pressure transmission member 60. Further, the diaphragm 10 in the pressure sensor 100 takes a shape of corrugation as illustrated in FIG. 2. That is, the diaphragm 10 is generally in a flat shape with a plural number of bends formed therein in the present embodiment.

The diaphragm 10 includes a contact portion 12 in contact with the pressure transmission member 60 as illustrated in FIG. 2. The contact portion 12 is generally in a flat shape, and the contact portion 12 is surrounded by an area having the shape of corrugation.

The contact portion 12 of the diaphragm 10 has an increased thickness relative to the area that surrounds the contact portion 12. More practically, the thickness of the contact portion 12 is approximately 300 μm, and the thickness of the surrounding area is approximately 200 μm. That is, the contact portion 12 is thicker than the surrounding area by 100 μm.

The corrugated shape of the diaphragm 10 is formed by bending the pressure sensing surface 11, that is, by bending up and down a flat material of the diaphragm 10 in, for example, a sine curve shape as shown in FIG. 2.

The pressure sensing surface 11 of the diaphragm 10 is in, for example, a circular shape with a diameter of 4 mm in the present embodiment. The corrugated shape of the pressure sensing surface 11 is formed coaxially around a center of the diaphragm 10. That is, the corrugated shape of the diaphragm 10 appears as a ripple sent out from the center of the diaphragm 10. The diaphragm 10 having the above-described shape and thickness is made by press work, cutting work or the like.

The diaphragm 10 having the above-described shape has resilience provided by the corrugated shape of the material, or more practically, by contraction and extension of the corrugated shape.

Therefore, the diaphragm 10 in the above-described shape maintains its resilience even when the thickness of the diaphragm 10 is increased relative to the thickness of a diaphragm in a conventional pressure sensor. In other words, the mechanical strength of the diaphragm 10 is improved by having an increased thickness without compromising the resilience because of the corrugated shape formed in the diaphragm 10.

The advantage of the pressure sensor 100 in the present embodiment is obvious if, in comparison, the diaphragm 10 is reinforced by simply increasing its thickness without having the area in the corrugated shape for maintaining its resilience.

Further, the housing 40 houses a substrate 42 made from a material such as ceramic or the like in the hollow space defined therein as shown in FIG. 1. The substrate 42 is electrically coupled with an IC chip 43 disposed thereon by a bonding wire (not shown in the figure). The IC chip 43 has a circuitry for controlling/amplifying an output from the sensing portion 50.

Furthermore, the IC chip 43 and the sensing portion 50 are electrically coupled with each other in the housing 40 by a wiring 44 made from a lead wire, a flexible printed circuit (FPC) or the like as shown in FIG. 1.

The connector portion 2 is attached to the housing 40 with an O ring 45 interposed therebetween. The connector portion 2 is made of resin such as Polyphenylene sulfide (PPS) or the like. The connector portion 2 has a metal terminal 2a inserted therein by insert molding.

The connector portion 2 is fastened on the housing 40 with one end inserted in an opening of the housing 40. More practically, the connector portion 2 is fastened by a periphery of the opening on the housing 40 for integrally forming the pressure sensor 100.

The terminal 2a in the connector portion 2 is electrically coupled with the substrate 42 in the housing 40. Further, the terminal 2a may be coupled with an external circuit such as an ECU of a vehicle for providing signal communication for the pressure sensor 100.

The diaphragm 10 of the pressure sensor 100 in the present embodiment has an improved mechanical strength without compromising its resilience because of the corrugated shape of the diaphragm 10 having a plural number of bends formed therein.

Further, the diaphragm 10 of the pressure sensor 100 is, as described above, in contact with the pressure transmission member 60 at the contact portion 12 that is surrounded by a resilient area in the corrugated shape, thereby providing a sufficient resilience for detecting the pressure applied thereon.

Furthermore, in the present embodiment, the contact portion 12 of the diaphragm 10 that is susceptible to a concentrated reaction force from relevant parts is reinforced by an increased thickness, thereby providing an improved mechanical strength for the diaphragm 10.

Although the present invention has been fully described in connection with the preferred embodiment thereof with reference to the accompanying drawings, it is to be noted that various changes and modifications will become apparent to those skilled in the art.

For example, the diaphragm 10 may take various kinds of shapes in terms of securely transmitting the pressure applied thereon. For example, the contact portion 12 of the diaphragm 10 in contact with the pressure transmission member 60 may take a convex shape, or may take a spherical shape as shown in FIG. 3A. In this manner, the contact portion 12 is in contact with the pressure transmission member 60 at a point, thereby enabling a secure transmission of the pressure.

Further, the contact portion 12 of the diaphragm 10 in contact with the pressure transmission member 60 may take a concave shape as shown in FIG. 3B. In this manner, the pressure transmission member 60 in contact with the contact portion 12 is prevented from displacement from a center of the diaphragm 10, thereby enabling a secure transmission of the pressure.

Furthermore, the angle of the bends in the diaphragm may be about 90 degrees, may be in a range between 70 to 110 degrees. In addition, the angle of the bends may be obtuse, or the angle of the bends may be acute.

Furthermore, the contact portion 12 may protrude from the surrounding area, or may be depressed relative to the surrounding area, thereby providing a increased resilient area for improving the resilience of the diaphragm 10 as shown in FIGS. 3C and 3D. In this case, the contact portion 12 may have the thickness that is different from the surrounding area.

Furthermore, an entire area of the diaphragm 10 may take a corrugated shape.

Such changes and modifications are to be understood as being within the scope of the present invention as defined by the appended claims.

What is claimed is:

1. A pressure sensor comprising:
   a sensor element having a sensing portion for generating a signal upon receiving a pressure;
   a pressure transmission member comprising solid material and having one end attached to a sensing portion of the sensor element; and
   a diaphragm having two sides that warp under application of the pressure, wherein one side serves as a pressure sensing surface for detecting the pressure applied thereon and another side serves as an attachment surface to be attached to another end of the pressure transmission member for transmitting the pressure to the sensing portion of the sensor element, and wherein the diaphragm takes a shape of corrugation that has a plural number of bends formed therein.

2. The pressure sensor as in claim 1, wherein the diaphragm contacts the pressure transmission member by a contact portion in a flat shape, and a surrounding area of the contact portion in the diaphragm takes the shape of corrugation.

3. The pressure sensor as in claim 1, wherein the diaphragm contacts the pressure transmission member by a contact portion in a convex shape, and a surrounding area of the contact portion in the diaphragm takes the shape of corrugation.

4. The pressure sensor as in claim 1, wherein the diaphragm contacts the pressure transmission member by a contact portion in a concave shape, and a surrounding area of the contact portion in the diaphragm takes the shape of corrugation.

5. The pressure sensor as in claim 1, wherein the diaphragm contacts the pressure transmission member by a contact portion, and the contact portion is thicker than a surrounding area of the contact portion in the diaphragm.

6. The pressure sensor as in claim 1, wherein the shape of corrugation circularly surrounds a center of the diaphragm in a coaxial manner.

7. The pressure sensor as in claim 1, wherein the number of bends on the diaphragm is at least two.

8. The pressure sensor as in claim 1, wherein the diaphragm contacts the pressure transmission member by a contact portion, and the contact portion protrudes from a surrounding area of the contact portion in the diaphragm.

9. The pressure sensor as in claim 1, wherein the diaphragm contacts the pressure transmission member by a contact portion, and the contact portion is depressed relative to a surrounding area of the contact portion in the diaphragm.

10. The pressure sensor as in claim 1, wherein the diaphragm contacts the pressure transmission member by a contact portion, and the contact portion is thicker than a surrounding area of the contact portion in the diaphragm by about 100 μm.

11. The pressure sensor as in claim 1, wherein the plural number of bends have an angle of about 90 degrees on a cross-sectional plane that cuts the diaphragm perpendicularly along a center axis of the pressure sensor.

12. The pressure sensor as in claim 1, wherein the plural number of bends generally have a range of angles substantially between 70 degrees and 110 degrees on a cross-sectional plane that cuts the diaphragm perpendicularly along a center axis of the pressure sensor.

13. The pressure sensor as in claim 1, wherein the diaphragm contacts the pressure transmission member by a contact portion, and the contact portion contacts the pressure transmission member in a pointing manner.

14. The pressure sensor as in claim 13, wherein the contact portion has a spherical shape.

15. The pressure sensor as in claim 1, wherein the plural number of bends generally have an acute angle on a cross-sectional plane that cuts the diaphragm perpendicularly along a center axis of the pressure sensor.

16. The pressure sensor as in claim 1, wherein the plural number of bends generally have an obtuse angle on a cross-sectional plane that cuts the diaphragm perpendicularly along a center axis of the pressure sensor.

17. The pressure sensor as in claim 1, wherein the solid material of the pressure transmission member is a metal.

18. The pressure sensor as in claim 1, wherein the solid material of the pressure transmission member is a ceramic material.

* * * * *